United States Patent
Wagner

(10) Patent No.: US 11,910,437 B2
(45) Date of Patent: Feb. 20, 2024

(54) CONFLICT AVOIDANCE IN A CELLULAR NETWORK

(71) Applicant: JRD COMMUNICATION (SHENZHEN) LTD., Guangdong (CN)

(72) Inventor: Sebastian Wagner, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 292 days.

(21) Appl. No.: 17/280,906

(22) PCT Filed: Sep. 26, 2019

(86) PCT No.: PCT/CN2019/108270
§ 371 (c)(1),
(2) Date: Mar. 28, 2021

(87) PCT Pub. No.: WO2020/063781
PCT Pub. Date: Apr. 2, 2020

(65) Prior Publication Data
US 2021/0345409 A1    Nov. 4, 2021

(30) Foreign Application Priority Data
Sep. 28, 2018    (GB) ...................................... 1815859

(51) Int. Cl.
*H04W 74/08*    (2009.01)
(52) U.S. Cl.
CPC .............................. *H04W 74/0816* (2013.01)
(58) Field of Classification Search
CPC ............................................... H04W 74/0816
See application file for complete search history.

(56) References Cited

U.S. PATENT DOCUMENTS

| 2015/0312793 | A1* | 10/2015 | Jeon ................. | H04W 28/0205 |
|---|---|---|---|---|
| | | | | 370/329 |
| 2016/0073344 | A1 | 3/2016 | Vutukuri et al. | |
| 2016/0081106 | A1 | 3/2016 | Zhou et al. | |
| 2016/0088618 | A1* | 3/2016 | Barriac ............. | H04W 74/0816 |
| | | | | 370/329 |
| 2016/0227578 | A1 | 8/2016 | Lee et al. | |
| 2017/0041901 | A1 | 2/2017 | Karaki | |
| 2018/0049129 | A1* | 2/2018 | Li ..................... | H04W 52/0235 |

(Continued)

FOREIGN PATENT DOCUMENTS

| CN | 103249166 A | 8/2013 |
|---|---|---|
| CN | 105657849 A | 6/2016 |
| CN | 106537966 A | 3/2017 |

(Continued)

OTHER PUBLICATIONS

Chinese Office Action issued in corresponding Chinese Patent Application No. 201980055294.9 dated Oct. 28, 2022, pp. 1-12.

(Continued)

*Primary Examiner* — Kevin M Cunningham
(74) *Attorney, Agent, or Firm* — PV IP PC; Wei Te Chung; Zhigang Ma

(57) ABSTRACT

Methods for managing transmission resource conflicts, particularly for cellular networks utilised unlicensed resources. Mobile devices may be configured using higher layer signalling to respond to RTS signals if the transmission resources are available.

11 Claims, 5 Drawing Sheets

(56) References Cited

U.S. PATENT DOCUMENTS

2020/0314906 A1* 10/2020 Goyal .............. H04W 74/0816

FOREIGN PATENT DOCUMENTS

| CN | 107113885 A | 8/2017 |
| CN | 107548570 A | 1/2018 |
| CN | 107667565 A | 2/2018 |
| EP | 3 198 977 A1 | 8/2017 |
| EP | 3 285 536 A1 | 2/2018 |

OTHER PUBLICATIONS

"On Receiver-assisted LBT for NR-U", TCL Communication, 3GPP TSG RAN WG1 Meeting #94bis, R1-1811081, Oct. 2018.

* cited by examiner

ID
CONFLICT AVOIDANCE IN A CELLULAR NETWORK

CROSS-REFERENCE TO RELATED APPLICATIONS

This application is a National Stage of International patent application PCT/CN2019/108270, filed on Sep. 26, 2019, which claims priority to foreign Great Britain patent application No. GB 1815859.2, filed on Sep. 28, 2018, the disclosures of which are incorporated by reference in their entirety.

TECHNICAL FIELD

The following disclosure relates to systems to avoid conflict in cellular networks, and in particular systems to avoid conflict when operating in unlicensed spectrum.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

FIG. 1 shows a schematic diagram of an example of three base stations forming a cellular network. In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a next generation NodeB (gNB). NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

In order to share resources a device (for example, a gNB or UE) monitors the available resources and only commences a transmission if there is no conflict with another device already utilising the resources. This is known as a Clear Channel Assessment (CCA). This is typically performed using a Listen Before Talk (LBT) protocol in which a device "listens" for transmissions on the resources for a period to determine if other devices are transmitting on those resources. If no transmissions are detected above any applicable thresholds, the LBT process is successful and the resources are "won". The device gNB or UE gains access to the resources for up to a Maximum Channel Occupancy Time (MCOT) provided there is no interruption of transmissions for more than a pre-defined interval (for example 16 µs).

FIG. 2 shows an example of a problem known as the "hidden node problem". UE1 is served by gNB1 and UE2 is served by gNB2. Each UE is located in the coverage area of its gNB, but each gNB is outside of the coverage area of the other gNB. gNB1 may gain access to the transmission medium and commence transmitting to UE1. gNB2 cannot sense gNB1's transmissions and hence may also start transmitting to UE2. However, since UE1 and UE2 are located in an area in which each gNB's coverage overlaps, the transmissions will interfere with each other and data reception may fail.

This problem can be mitigated utilising receiver-assisted LBT. In such a system, once a base station acquires channel access the base station transmits a "Request To Send" (RTS) message and if the respective UE senses the channel is clear it responds with a "Clear To Send" (CTS) response. The process is often known as an RTS/CTS handshake.

If applying this method in the example of FIG. 2, UE2 would detect the transmissions from gNB1 and would hence respond to the RTS in the negative (or send no response), thus indicating that gNB2 should not start transmitting.

However, in multi-user systems such as cellular networks conventional RTS/CTS signalling creates a large control overhead which is undesirable.

There is therefore a requirement for an improved mechanism to avoid resource conflicts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention is defined by the appended claims.

In another aspect, there is provided a non-transitory computer-readable medium. The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
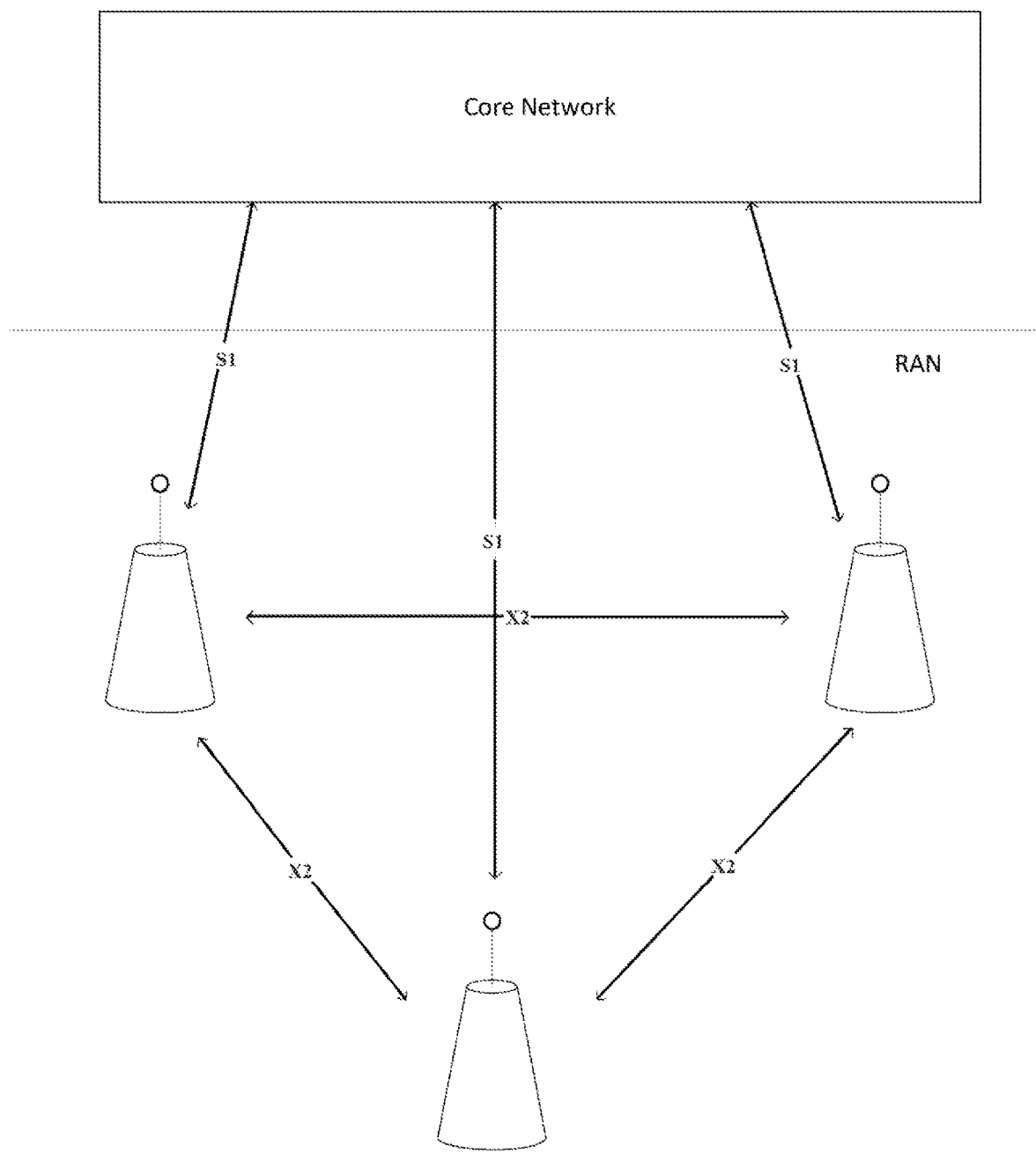
FIG. 1 shows an example of a cellular communications network.
Figure 2:
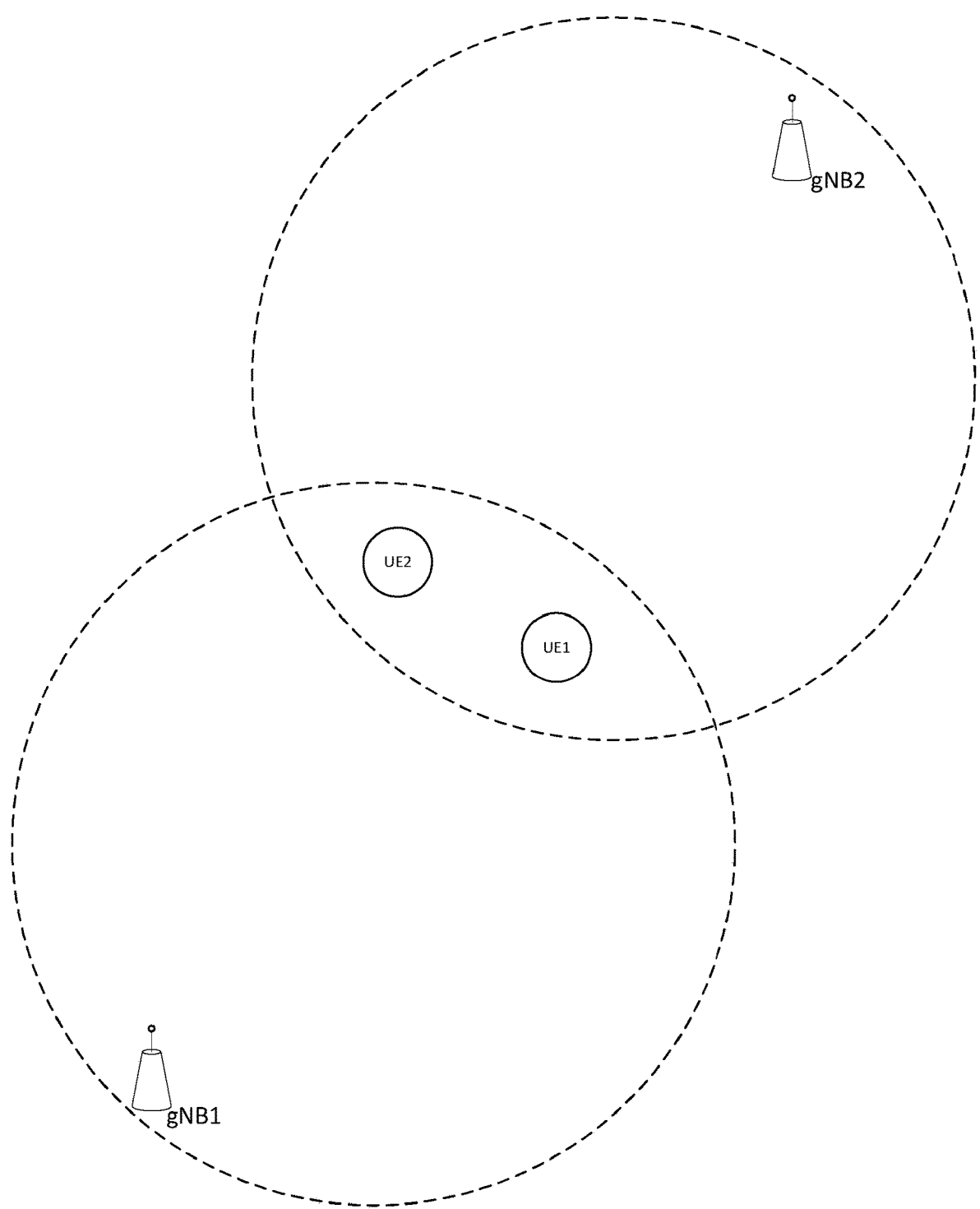
FIG. 2 shows a hidden node problem.

As explained above, FIG. 1 shows a schematic diagram of three base stations (for example, eNB or gNBs depending on the particular cellular standard and terminology) forming a cellular network. The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data. For convenience the term UE will be used to refer to all types of mobile device.

Figure 3:
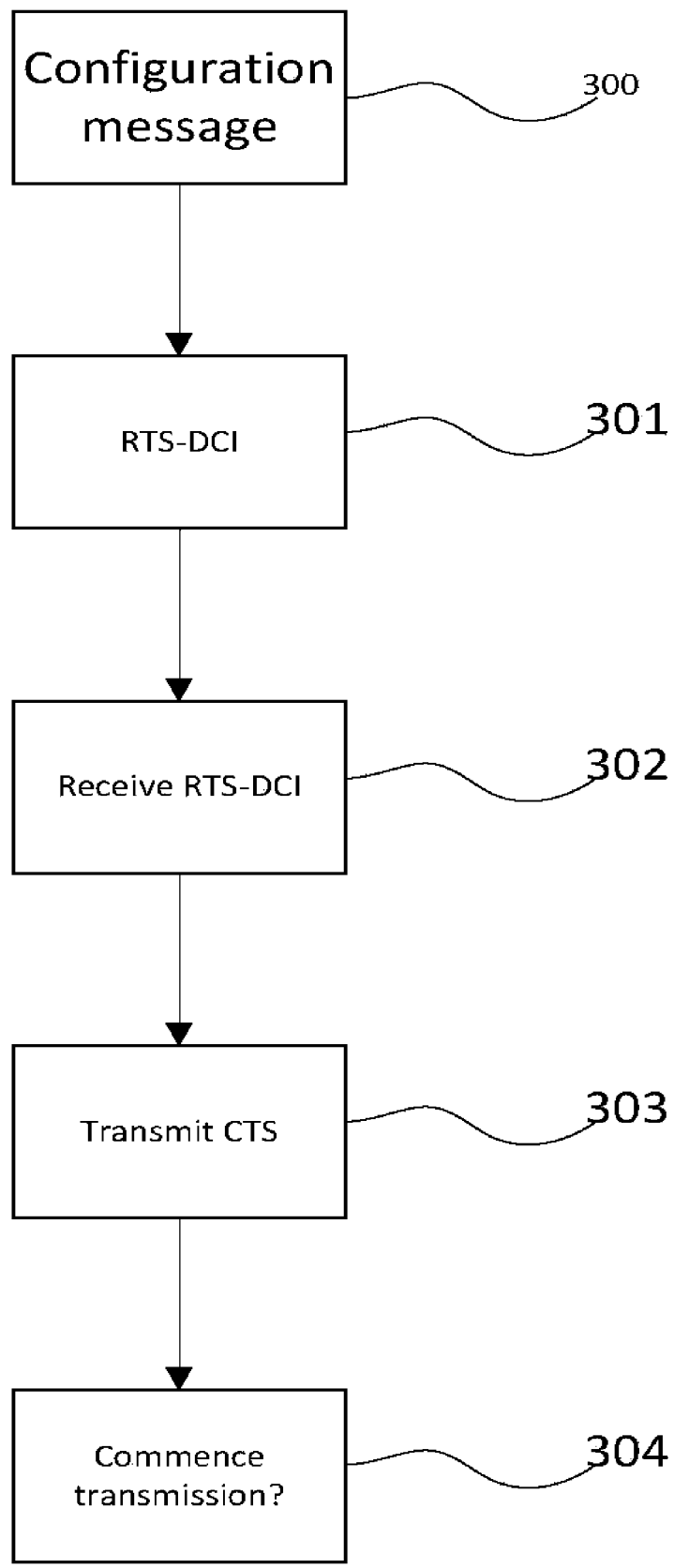
FIG. 3 shows a flow chart of an RTS/CTS method.

FIG. 3 shows a method for avoiding conflict in cellular communication systems. At step 300 a base station transmits an RTS/CTS configuration message to a UE to activate an RTS/CTS mechanism for the UE. The message may be a higher layer message, such as RRC. The message may only activate the process or may include configuration parameters. The activation message configures the UE's behaviour and thus provides semi-static configuration of the UE which does not need to be repeated each time an RTS/CTS process is required. Messages may also be provided to deactivate the RTS/CTS configuration.

The activation message may include one of more configuration parameters selected from:—
- Which CTS signal to use, for example to make the CTS signal UE-specific. For example, which shift or root to use if a Zadoff-Chu sequence is utilised to identify the UE.
- Which transmission resources (time and/or frequency) to transmit the CTS message.
- Information to enable the triggered UEs to perform a synchronous UL transmission of their CTS (for example a common LBT back-off value).
- CTS periodicity within the COT with respect to UL occasions. If no periodicity is configured, every RTS triggers exactly one CTS message in a configured UL occasion. Other periodicities may be utilised such that the UE transmits a CTS message at intervals to provide an on-going indication to the base station of transmission resource status. For example, a periodicity of 2 indicates that a CTS message is to be sent in every second UL occasion after reception of RTS, and a periodicity of 1 indicates every UL occasion.
- The duration of the periodic CTS transmission can be specified such that it does not continue indefinitely. For example, if periodicity is set to 1, and duration to 4, 4 CTS messages are sent in sequential UL windows after each RTS message is received.
- If the UE identification utilises a bitmap, the bit applicable to the UE is indicated.

At step 301, when access to the transmission medium has been obtained (for example, using an LBT process), the base station transmits a Downlink Control Information (DCI) message which is scrambled with a specific Radio Network Temporary Identifier (RNTI). The terms RTS-DCI and RTS-RNTI will be utilised for convenience for this message and identifier.

The RTS-DCI is transmitted in a common CORESET which is configured for the UE for which the message is intended to monitor for RTS-DCI, or in a specific group-common CORESET which has been configured for RTS-DCI.

The RTS-DCI includes an indication of the UEs from which a CTS response is requested. For example, the RTS-DCI may include the ID of each UE, for example the connection RNTI (C-RNTI). However, the UE-IDs may be of significant size and impart a significant control overhead if multiple UEs are addressed. In an alternative the RTS-DCI may include a bitmap indicating which UEs are being addressed. UEs are assigned a bit within the bitmap which indicates they are being addressed. This allocation may be indicated to the UE in the higher layer signalling at step 300. A bitmap may reduce the control overhead required since only one bit is required in the RTS-DCI for each UE.

To control the size of the RTS-DCI, UEs may be grouped and a different RTS-RNTI allocated to each group. Alternatively, different common CORESETs may be utilised for different groups of UEs. The same RTS-RNTI can then be used for all UEs, with the UEs being grouped by the CORESET to which they are allocated. That is, all UEs monitor for the same RTS-RNTI, but different groups monitor in different CORESETs. This may enable different CORESET periodicities to be configured for different groups of UEs.

The RTS-DCI may also indicate resources (e.g. time and/or frequency) for the UE to utilise for its CTS response, the CTS periodicity (as discussed above) in the current COT, and/or the duration of the CTS periodicity (as discussed above) in the current COT. If these parameters have previously been configured by the higher layer signalling the settings in RTS-DCI may override those previous settings. If settings are not included, the higher-layer settings are utilised.

If a bitmap is utilised to indicate the UE and the message also includes an indication of resources, parameters for the resources may be included in the same order as the bitmap such that each UE can identify the parameters applicable to it. In this example either none or all UEs can be sent an indication of resources.

At step 302 the UE receives the RTS-DCI and checks whether a CTS response is required.

At step 303 the UE ascertains the status of the transmission medium and transmits an appropriate response. For example, if the transmission medium is available a positive response may be sent, or if the transmission medium is not available a negative response, or no response, may be sent. The response is transmitted in the appropriate UL transmission window, which usually will be the first available UL transmission window, or in the resources indicated in the RTS-DCI.

At step 304 the base station either commences transmission, or does not, depending on the CTS received (or not received).

Figure 4:
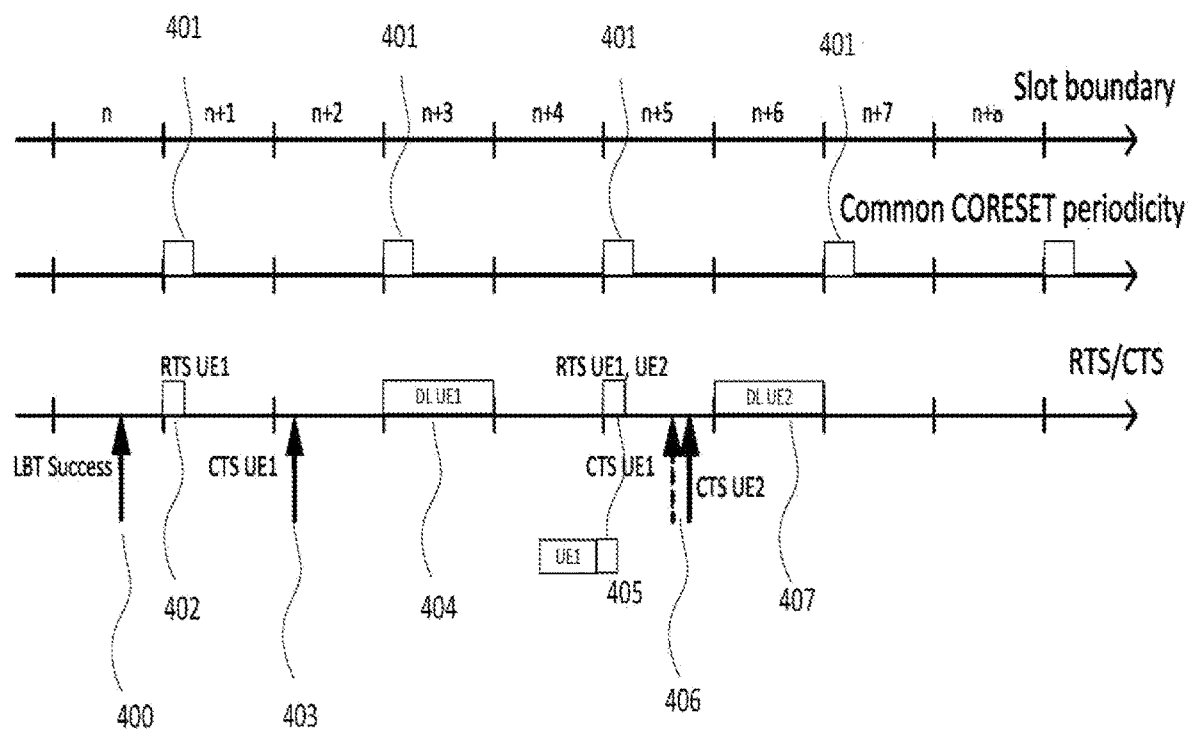
FIGS. 4 and 5 show example transmissions in an RTS/CTS method.

FIG. 4 shows an example of the process described hereinbefore. A base station is serving two UEs, UE1 and UE2 and acquires the transmission channel at 400. UE1 and UE2 have previously been configured to activate the RTS/CTS process to monitor for RTS-DCI on a common CORESET 401 every other slot.

After acquiring the transmission medium the base station has a transmission for UE1 and hence transmits a RTS-DCI 402 in the first available CORESET for UE1. After confirming the transmission resources are available, UE1 transmits a CTS message 403 in the appropriate UL resources. The base station then proceeds with the transmission at 404. Subsequently, the base station has data for both UE1 and UE2 and so transmits an RTS 405 in the next available CORESET to both UEs. In this example there is an UL occasion 406 in the same slot. The base station successfully receives the CTS from UE2, but not from UE1. The gNB thus only transmits data to UE2 at 407.

The CTS from UE1 may not have been transmitted if the UE detects resources are not available, or it is unavailable to receive the transmission, thereby avoiding a collision.

Figure 5:
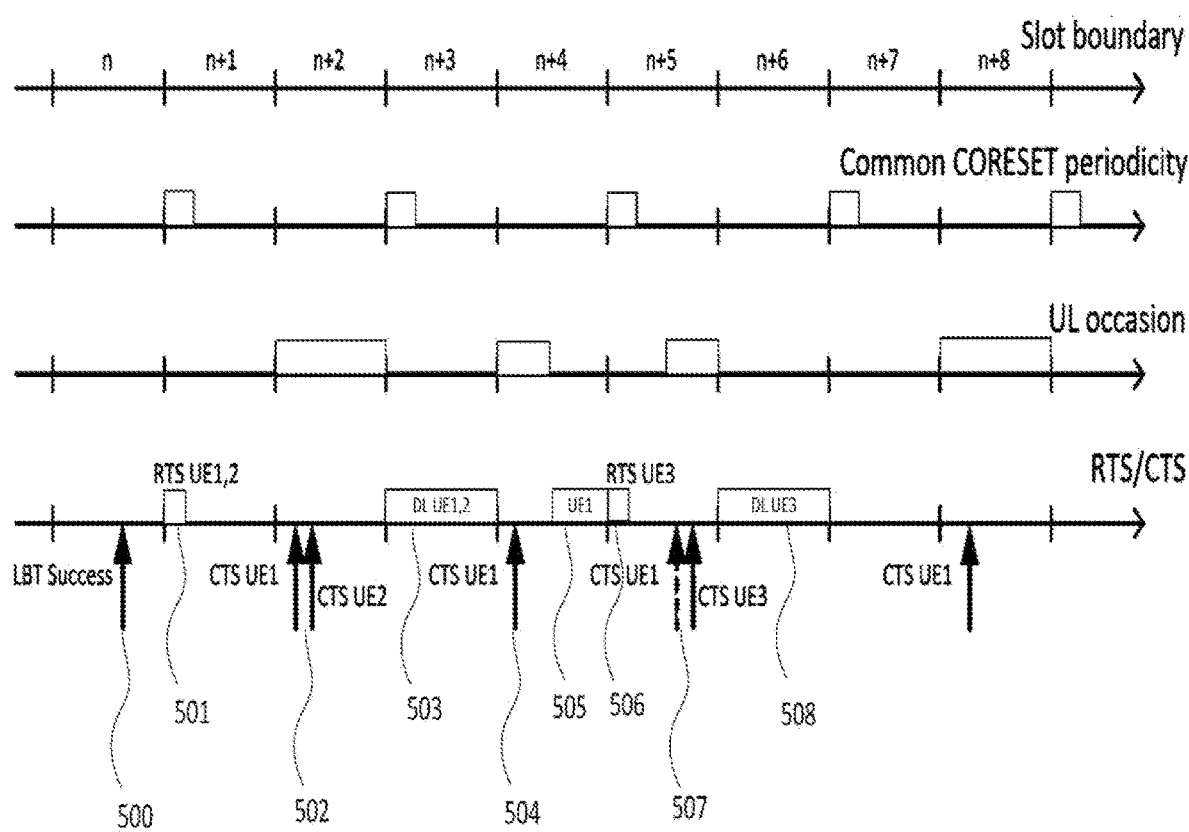

FIG. 5 shows an example of a periodic CTS configuration. A base station is serving three UEs, UE1, UE2, and UE3. At 500 the base station acquires access to the transmission medium and transmits an RTS-DCI at 501 to UE1 and UE2. UE1 is configured to transmit CTS in every UL occasion on predefined resources (in an alternative this configuration may have been made in the higher layer signalling.

UE1 and UE2 transmit CTS at 502 in the first UL window. The base station subsequently transmits the data in the DL window 503.

Although there is no further RTS, UE1 transmits a CTS at 504 due to the periodic configuration, and a further DL transmission is sent to UE1 at 505.

At 506 the base station transmits an RTS-DCI to UE3 and receives an CTS response 507. However, no CTS is received from UE1 as was expected from the periodic configuration, potentially due to a lack of transmission resources, for example due to the hidden node problem. The base station thus transmits to UE3 only at 508. Subsequently, UE1 is available to receive again and transmits the period CTS at 508.

The period configuration may reduce the control overhead since only one RTS-DCI is required for UE1 for a number of CTS reports and DL transmission opportunities.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein. Storage medium such as these examples may be known as non-transitory storage medium. A control module (in this example, software instructions or executable computer program code), when executed by the processor in the computer system, causes a processor to perform the functions of the invention as described herein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for conflict avoidance in a cellular communication network, the method comprising the steps of:
   transmitting a request-to-send/clear-to-send (RTS/CTS) configuration message from a base station of the cellular network to a mobile device served by the base station to cause the mobile device to activate an RTS/CTS process, wherein the RTS/CTS configuration message comprises a periodicity for transmission of the at least one CTS;
   transmitting an RTS message from the base station to the mobile device requesting at least one CTS message from the mobile device, wherein the RTS message is a downlink control information (DCI) message, the DCI message is transmitted in a group-common control-resource set (CORESET) corresponding to the mobile device being addressed by the RTS message; and
   receiving a CTS message at the base station from the mobile device in accordance with the RTS/CTS process;
   wherein the RTS/CTS configuration message comprises an indication of a CTS signal to utilise;
   the indicated CTS signal is UE-specific; and
   the indication of a CTS signal indicates which shift or root of a Zadoff-Chu sequence to utilise.

2. The method according to claim 1, wherein the RTS/CTS configuration message is a higher-layer message.

3. The method according to claim 1, wherein the RTS/CTS configuration message is an RRC message.

4. The method according to claim 1, wherein the RTS/CTS configuration message comprises an indication of a mapping of the UE to a bit in a bitmap to be utilised in the RTS message.

5. The method according to claim 1, wherein the RTS/CTS configuration message comprises an indication of CTS repetitions.

6. The method according to claim 1, wherein the RTS/CTS configuration message comprises an indication of resources for transmission of at least one CTS message.

7. The method according to claim 1, wherein the RTS/CTS configuration message comprises information to enable the CTS message to be transmitted synchronously with other UEs.

8. The method according to claim 1, wherein the DCI message is encoded using a specific RNTI defined for RTS messages.

9. The method according to claim 1, wherein the RTS message comprises a bitmap field in which each bit corresponds to the requested RTS/CTS configuration of a predefined mobile device.

10. The method according to claim 1, wherein the RTS message comprises at least one of a periodicity for transmission of the at least one CTS, an indication of CTS repetitions, an indication of resources for transmission of at least one CTS message.

11. A base station configured to perform the method of claim 1, wherein the RTS/CTS configuration message is a higher-layer message.

* * * * *